US011944890B2

(12) United States Patent
Mattellini

(10) Patent No.: US 11,944,890 B2
(45) Date of Patent: Apr. 2, 2024

(54) COUPLING DEVICE FOR A VERTICAL POLE FOR GYM EXERCISES

(71) Applicant: LA.ME Di Mattellini Angelo e Danilo & C SAS, Terno d'Isola (IT)

(72) Inventor: Angelo Mattellini, Terno d'Isola (IT)

(73) Assignee: LA.ME Di Mattellini Angelo e Danillo & C SAS, Terno d'Isola (IT)

( * ) Notice: Subject to any disclaimer, the term of this patent is extended or adjusted under 35 U.S.C. 154(b) by 87 days.

(21) Appl. No.: 17/856,104

(22) Filed: Jul. 1, 2022

(65) Prior Publication Data

US 2023/0001280 A1    Jan. 5, 2023

(51) Int. Cl.
*A63B 71/02* (2006.01)
*A63B 9/00* (2006.01)

(52) U.S. Cl.
CPC .............. *A63B 71/028* (2013.01); *A63B 9/00* (2013.01); *A63B 2244/225* (2013.01)

(58) Field of Classification Search
CPC ... A63B 71/028; A63B 9/00; A63B 2244/225; A63B 21/00047; A63B 21/1681; A63B 2225/093; F16C 11/0661; F16C 2316/30; F16C 11/0609; F16C 11/0623; F16C 11/10; F16C 11/106
See application file for complete search history.

(56) References Cited

U.S. PATENT DOCUMENTS

| 1,591,398 | A | * | 7/1926 | Newbold | F16D 3/221 464/141 |
| 3,187,635 | A | * | 6/1965 | Koss | B23Q 1/54 29/404 |
| 3,644,023 | A | * | 2/1972 | Villani | G02C 5/2227 351/113 |
| 3,815,902 | A | * | 6/1974 | Tomlinson | A63B 5/02 482/16 |
| 5,037,093 | A | * | 8/1991 | Roark, Jr. | A63B 63/083 473/483 |
| 10,369,450 | B1 | * | 8/2019 | Palmer | A63B 71/023 |
| 2004/0077418 | A1 | * | 4/2004 | Shulla | A63C 17/26 472/88 |
| 2015/0321062 | A1 | * | 11/2015 | Tyndall | A63B 69/0002 473/456 |
| 2021/0362043 | A1 | * | 11/2021 | Ban | F16C 11/06 |

FOREIGN PATENT DOCUMENTS

| AU | 2017406638 A1 * | 10/2019 | ....... A63B 21/00047 |
| WO | WO-03089800 A2 * | 10/2003 | ............. F16D 3/221 |

* cited by examiner

*Primary Examiner* — Garrett K Atkinson
(74) *Attorney, Agent, or Firm* — Jack Schwartz & Associates, PLLC

(57) ABSTRACT

Coupling device (20) for a vertical pole (8) for gym exercises comprising a hemispherical element (3) positioned inside a seat (22), a base (1), a shaft (5) inserted inside the hemispherical element (3) to which the vertical pole (8) for gym exercises is connected, said device (20) being characterized in that the hemispherical element (3) comprises a plurality of blocking elements (10, 33, 45) configured to be coupled to a plurality of corresponding elements (26, 34, 44), made on the inner surface of the seat (22) of the hemispherical element (3) to prevent the rotation of the pole (8) around an axis (X) passing through the centre of the coupling device (20) while leaving free the oscillatory movement of the pole (8) with respect to said axis (X).

9 Claims, 7 Drawing Sheets

COUPLING DEVICE FOR A VERTICAL POLE FOR GYM EXERCISES

TECHNICAL FIELD OF THE INVENTION

The present invention relates to an innovative coupling device for a vertical pole for gym exercises. In particular, the innovative device is able to ensure an extremely firm fixing of a vertical pole even in places where the support surfaces on the ceiling and the floor do not allow the perpendicularity of the equipment to be firmly maintained.

BACKGROUND ART

As is well known, gym disciplines using vertical poles have developed considerably in recent years.

One example is pole dancing, i.e. a mixture of gym and pole dance. In particular, this discipline is performed using a vertical pole and the Chinese pole. Further examples are lap dance, calisthenics, flagman, etc., which also require a pole firmly fixed to the floor and ceiling. These disciplines are in fact based on the performance of acrobatic figures, which require considerable strength, fluency, coordination, agility, flexibility and endurance.

In particular, the evolution of these sporting activities sees practitioners engaged in increasingly complex evolutions that place ever greater demands on the equipment. Moreover, the spread of this sport has seen the development of competition circuits held both outdoors and in theatres and arenas.

The installation of the elements used in these sports (pole dance poles, lap dance poles, Chinese poles, etc.) requires the pole to be installed perfectly vertical. However, sometimes the inclination of the support surface does not allow the perpendicularity of the equipment to the base to be maintained (e.g. in domestic locations, gyms, Italian-style theatres), which causes problems with the rotation of the pole and the performance of the figures. Parallelism defects between floor and ceiling can also be found in private homes.

Systems can be provided to correct these misalignments of the pole, which are usually minimal. A well-known solution is that described in patent No. GB2446126B, which shows a rounded pin working in a rounded cavity. However, since the pole must be able to be both static and rotating, the friction generated in a connection such as the one described is not sufficient to guarantee that the pole, in the static mode, remains perfectly still due to the high stresses generated by the practitioners.

There is therefore a need for a pole that overcomes the disadvantages of the vertical poles for gym exercises currently on the market, and in particular that is extremely stable in the various positions of use and for the purposes for which it is used.

SUMMARY OF THE INVENTION

The object of the invention is therefore to provide an innovative coupling device for a vertical pole for gym exercises, capable of keeping the pole firmly fixed to the ceiling and the floor even in places where the support surfaces do not allow the perpendicularity of the equipment to be firmly maintained.

The solution of the present invention allows to follow the inclination of the surfaces allowing the pole to remain perfectly vertical. In order to achieve this result, the pole includes a coupling device that prevents its rotation with respect to the base when the pole is used in static mode.

Furthermore, since the pole needs to be fixed between two coupling surfaces (typically to the floor and the ceiling) according to the present invention using also the thrust generated by the extension of the pole, there is also provided a system for lifting the pole itself, integrated in the base.

Further preferred and/or particularly advantageous embodiments of the invention are described according to the features set forth in the dependent claims.

BRIEF DESCRIPTION OF THE DRAWINGS

The invention will be described below by means of the following drawing plates, which are entirely illustrative and not limiting.

DETAILED DESCRIPTION

A coupling device 20 for a vertical gym pole which is the subject of the present invention is shown in FIGS. 1-9. It can be positioned at either end of a vertical gym pole 8 so that the latter is firmly anchored to the floor and ceiling respectively or, in any case, towards the two opposite walls to which it is applied.

Figure 1:
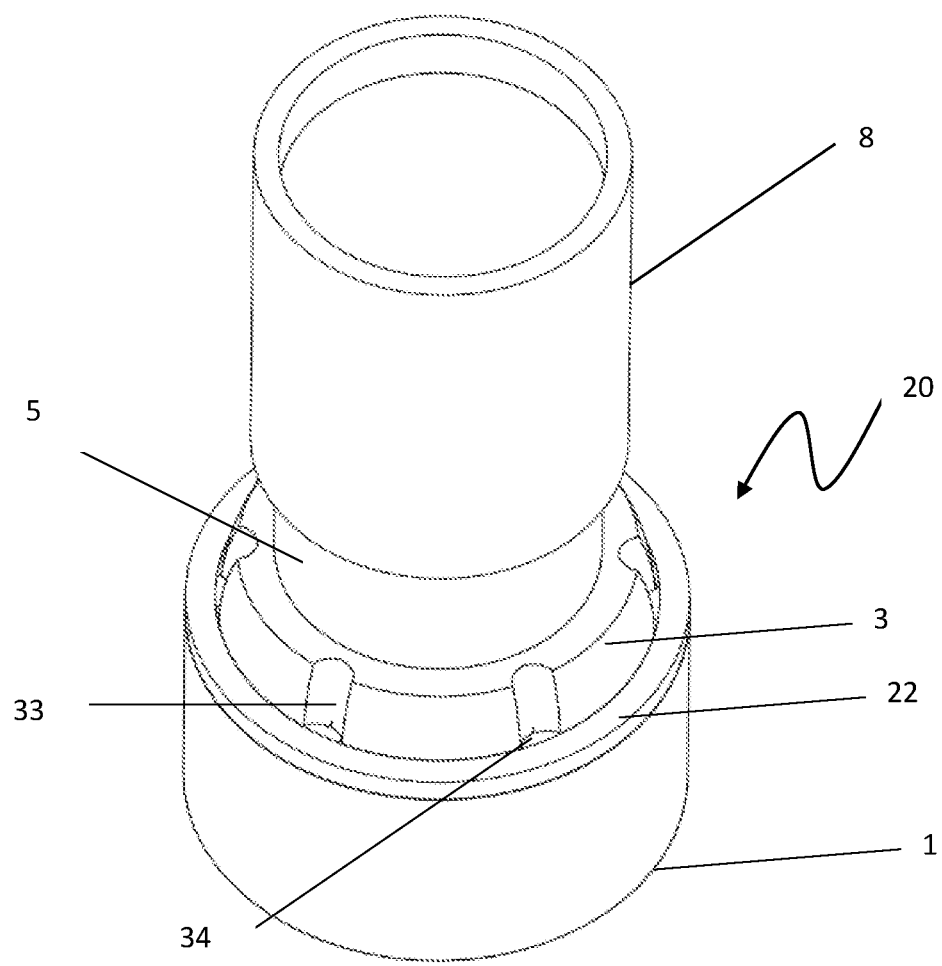
FIG. 1 is an overall view of the coupling device of a vertical pole for gym exercises, in a first embodiment of the present invention.

According to a first embodiment of the present invention, a coupling device 20 is shown in FIG. 1. The coupling device 20 comprises a hemispherical element 3 within which a shaft 5 connected to a vertical gym pole 8 is inserted. The hemispherical element 3 is contained within a seat 22 of the base 1, which is also hemispherical. In this embodiment, the hemispherical element 3 is made in one piece with the shaft 5 engaging in the vertical gym exercise pole. In this case the pole 8 is only static. Outside the hemispherical element 3 are a series of constraints called blocking elements 33 which, suitably positioned, prevent the rotation of the pole 8 around an axis X passing through the centre of the device 20. The blocking elements 33 are, for example, a plurality of recesses made in the outer wall of the hemispherical element 3 and which engage with a second corresponding plurality of reliefs 34, made on the inner surface of the seat 22 of the hemispherical element 3.

Advantageously, in an alternative configuration, the plurality of reliefs 34 may be positioned on an inner ring accommodated between the hemispherical element 3 and the seat 22.

Figure 2:
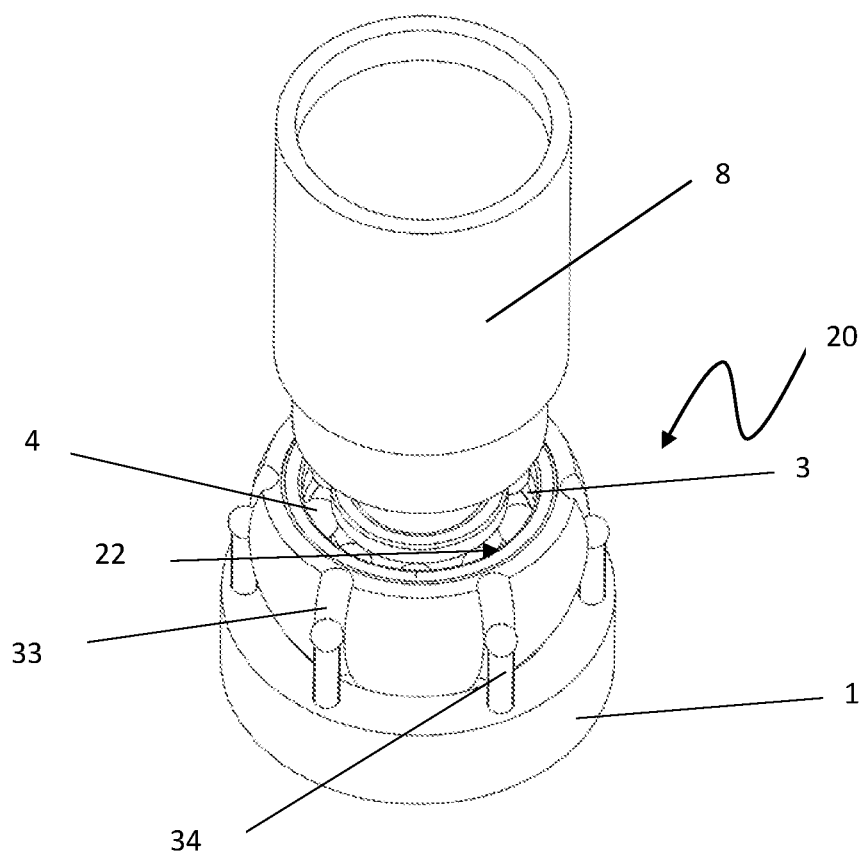
FIG. 2 is an overall view of the coupling device of a vertical gym exercise pole, in a second embodiment of the present invention.

According to a second embodiment of the present invention, a coupling device 20 is shown in FIG. 2. The coupling device 20 comprises a hemispherical element 3. The hemispherical element 3 is contained within a seat 22, of the base 1, which is also hemispherical. The hemispherical element 3 houses within it at least one bearing 4, also of different types: thrust bearing, double crown, etc., in which a shaft 5 connected to a vertical pole 8 for gym exercises is inserted. In this case, the pole is only rotatable. On the outside of the hemispherical element 3 there are a series of constraints called blocking elements 33 which, suitably positioned, prevent the rotation of the pole 8 around an axis X passing through the centre of the device 20. The blocking elements 33 are, for example, a plurality of recesses made in the outer wall of the hemispherical element 3 and which engage with a second corresponding plurality of reliefs 34, made on the inner surface of the seat 22 of the hemispherical element 3.

Figure 3:
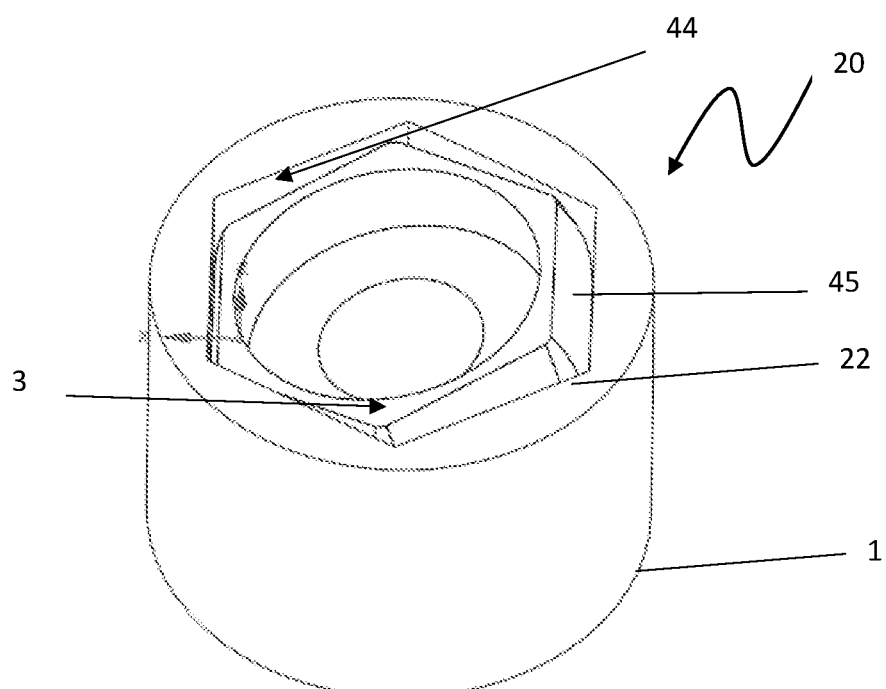
FIG. 3 is a detail view of the coupling device of a vertical pole for gym exercises, in a third embodiment of the present invention.

According to a third embodiment of the present invention, a coupling device 20 is shown in FIG. 3. The coupling device 20 comprises a hemispherical element 3. The hemispherical element 3 is contained within a seat 22, of the base 1, which is also hemispherical. The hemispherical element 3 is a regular polygon, for example a hexagon, with a plurality of blocking elements 45 (six curved side faces in the case of the hexagon) configured to be selectively coupled to a plurality of corresponding flat walls 44 (six walls, in the case of the hexagonal-shaped embodiment). The flat walls 44 are made on the inner surface of the seat 22 of the hemispherical element 3 respectively to prevent the rotation of the pole 8 around an axis X passing through the centre of the device 20, while leaving free the oscillatory movement of the pole 8 with respect to the same axis X.

Figure 4:
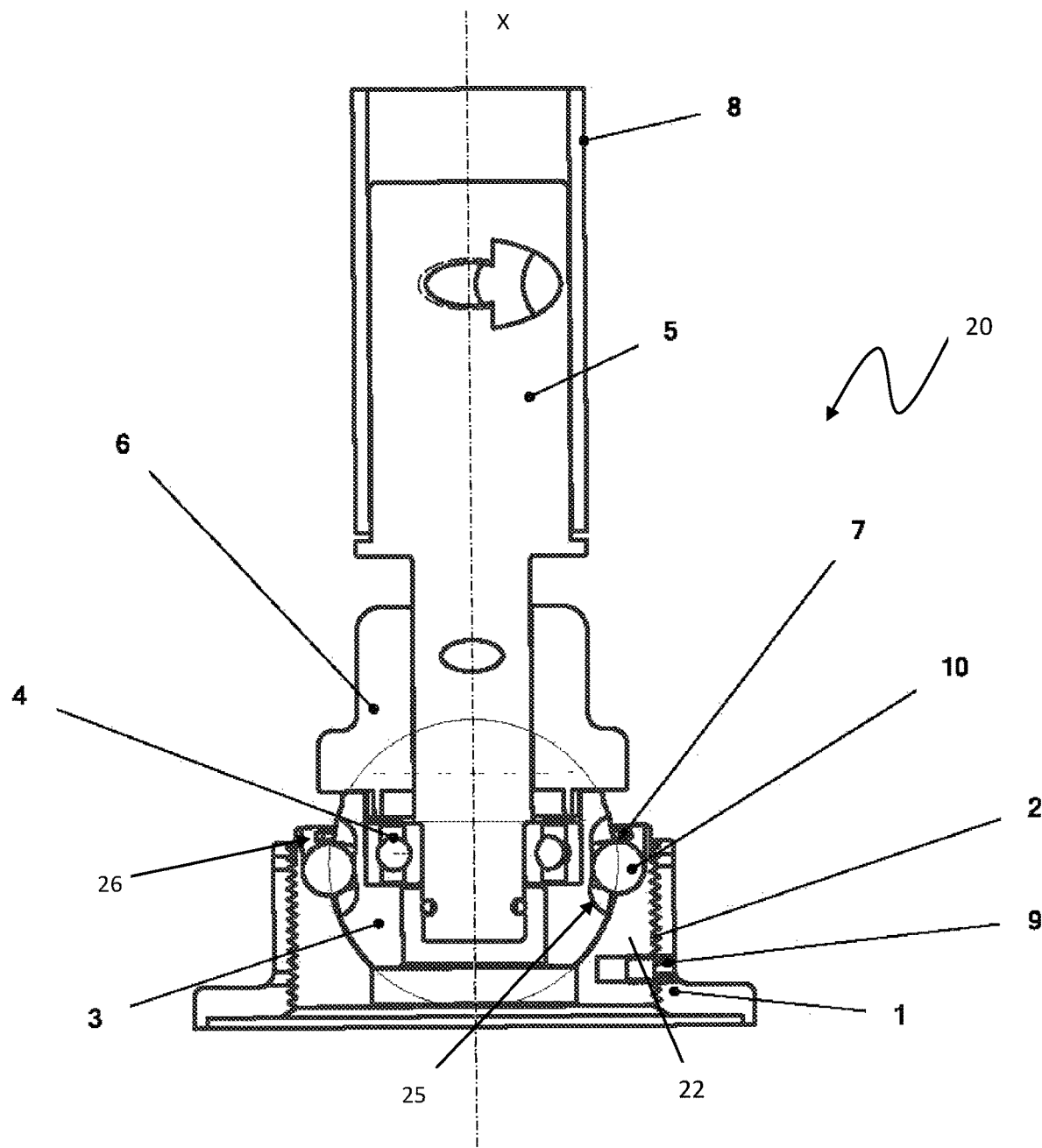
FIG. 4 is a cross-sectional view of the coupling device of the vertical pole for gym exercises, in a fourth embodiment of the present invention.

As illustrated in FIG. 4, according to a fourth form of implementation, the coupling device 20 comprises a hemispherical element 3 housing at least one bearing 4, also of different types: thrust bearing, double crown, etc., in which a shaft 5 connected to a vertical pole 8 for gym exercises is inserted. On the outside of the hemispherical element 3 there are a series of constraints called blocking elements 10 which, suitably positioned, prevent the rotation of the pole 8 about an axis X passing through the centre of the device 20, while leaving free the oscillatory movement of the pole 8 with respect to the same axis X. The blocking elements 10 are, for example, a plurality of balls positioned within a first plurality of recesses 25 made in the outer wall of the hemispherical element 3 and engaging with a second corresponding plurality of recesses 26, made on the inner surface of the seat 22 of the hemispherical element 3.

The hemispherical element 3 is housed inside a seat 22, of the base 1, which is also hemispherical and whose external wall can be threaded 2, in order to be able to adjust the height and put the pressure on the pole 8. Alternatively, the same purpose can be achieved by, for example, providing external feet connected to the base 1, in which case the adjustment and pressurisation will have to be carried out in another manner.

Figure 9:
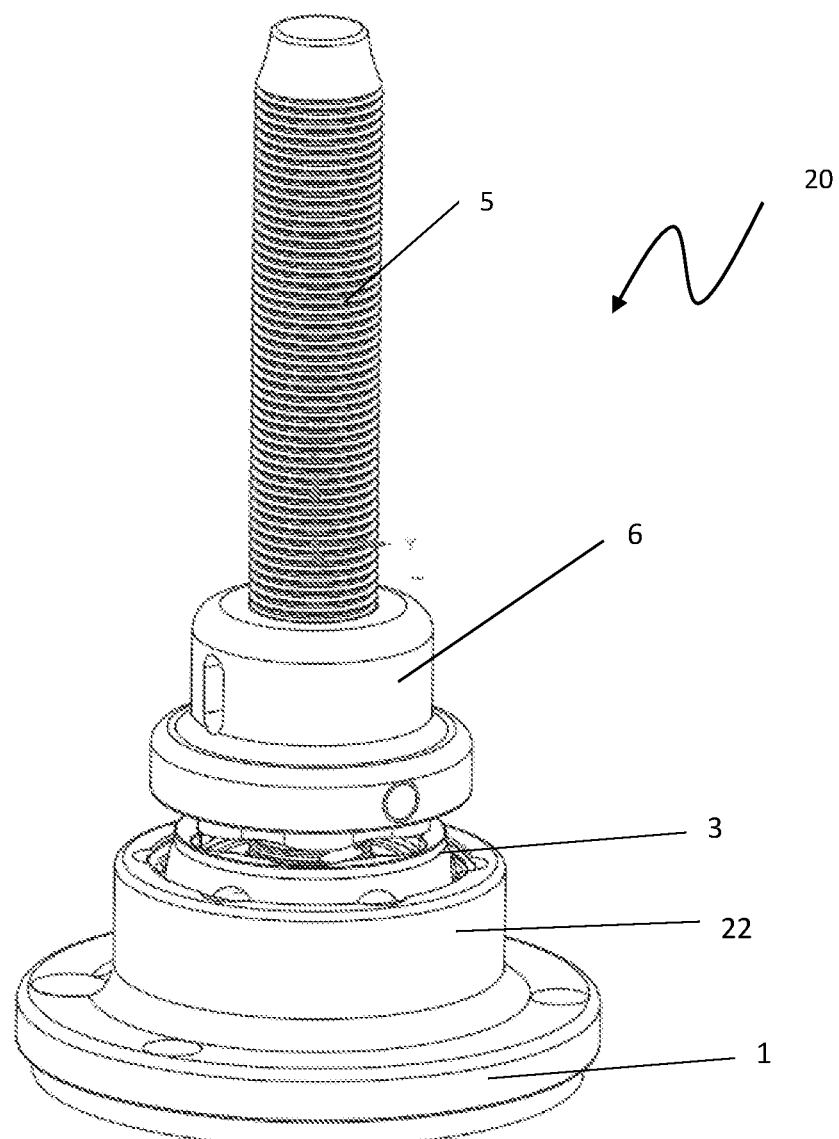
FIG. 9 is an overall view of the coupling device, showing the threaded shaft of the vertical pole for gym exercises, according to the invention.

Advantageously, base 1 can be fixed to the ceiling or floor by means of suitable fasteners or can simply be placed on top. As shown in FIG. 9, the pressure exerted by the thread on the shaft 5 of the pole 8, once extended, generates a thrust between the ceiling and the floor, equivalent to a weight of about 350 kg, thus allowing a stable adhesion of the base 1.

Figure 5:
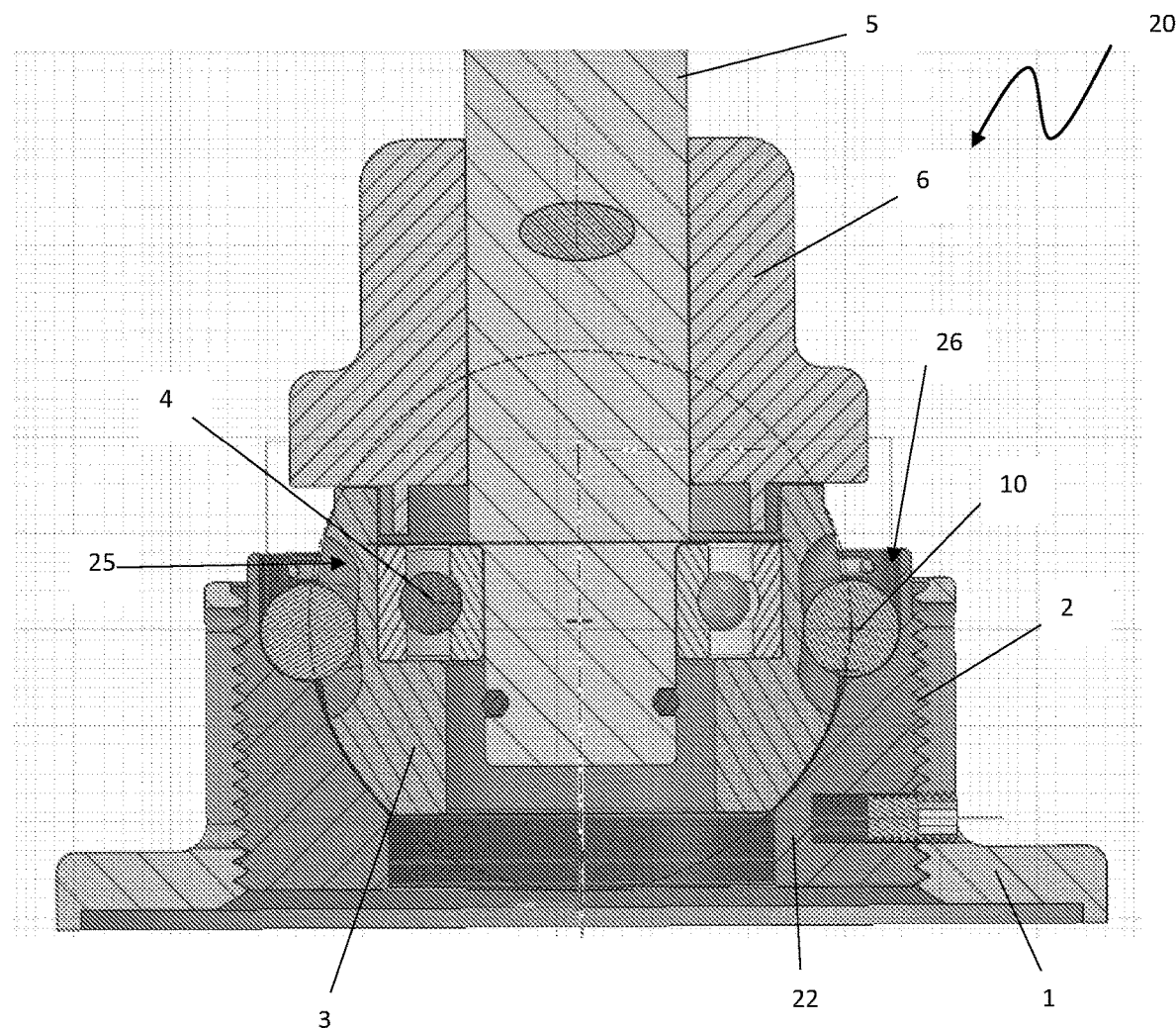
FIG. 5 is a cross-sectional view of the coupling device of FIG. 4 according to a first example of use.
Figure 6:
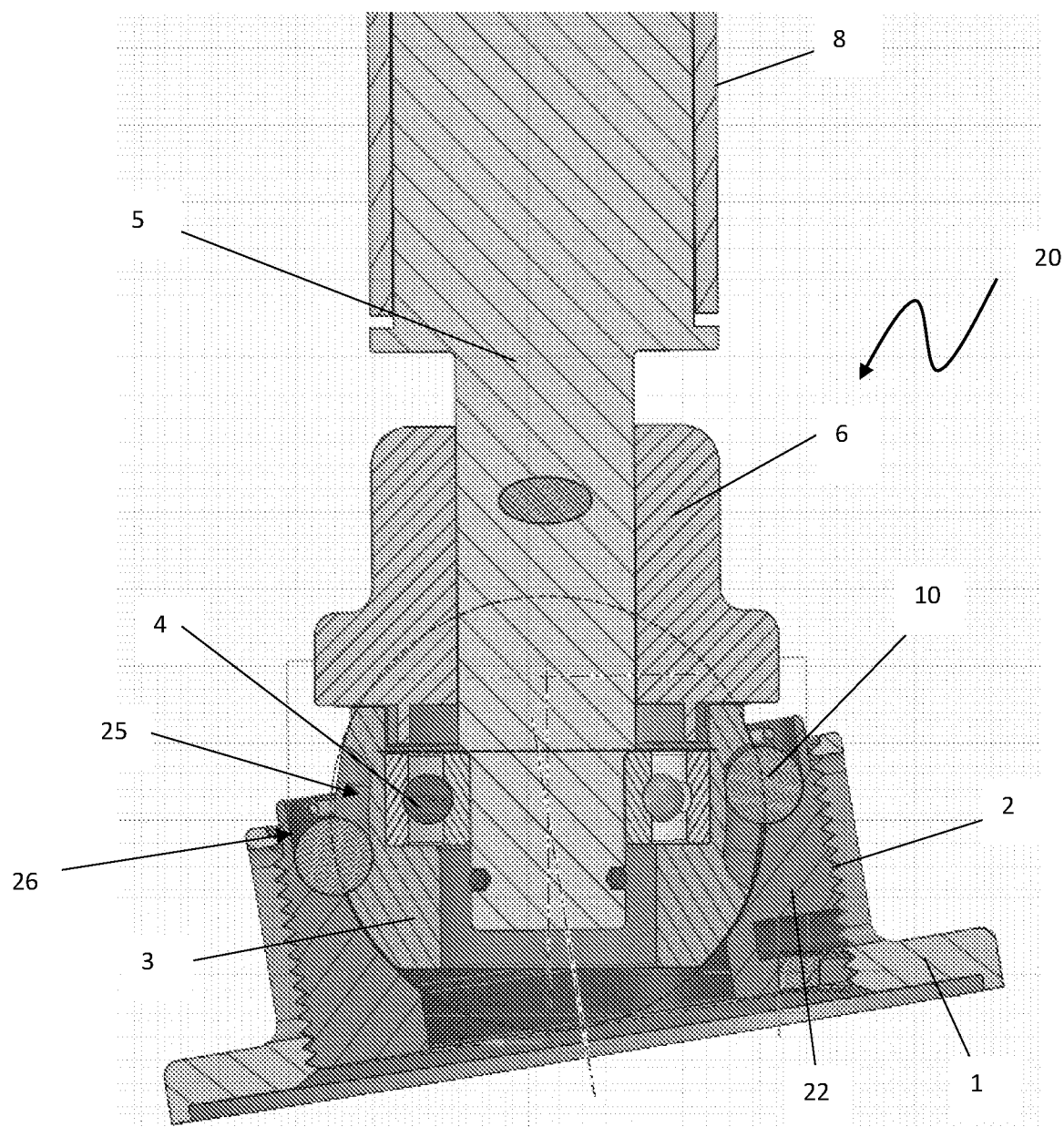
FIG. 6 is a cross-sectional view of the pole coupling device of FIG. 4 according to a further example of use.

As shown in the configuration of FIG. 4, there is a selector means 6, which is engaged by the hemispherical element 3, which allows the pole 8 to rotate on itself around the X axis. On the other hand, as shown in FIGS. 5 and 6, when the selector means 6 is engaged on the hemispherical element 3, it makes the pole 8 integral with the hemispherical element 3 itself and the pole 8 therefore remains free to oscillate in all directions but is prevented from rotating. Therefore, the selector means 6 is configured to assume two different positions: a position in which it engages the hemispherical element 3 and a position in which it is disengaged from the hemispherical element 3.

The anchoring of the vertical pole for gym exercise within two opposite walls is achieved by adjusting the pole 8 through the presence of the threaded shaft 5 (FIG. 9).

Advantageously, the pressurisation of the pole 8 is easily carried out by means of a threaded outer wall 2 of the seat 22, to adjust the height and pressurise the pole 8 (FIGS. 5 and 6).

Figure 7:
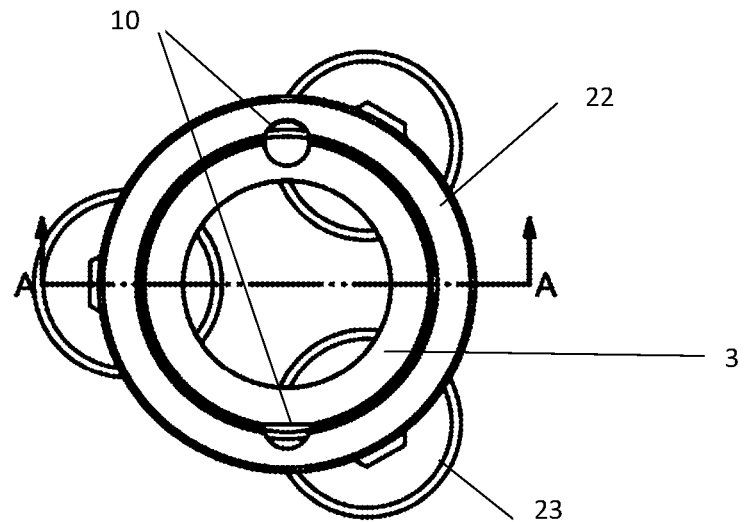
FIG. 7 is a cross-sectional view of a detail of the pole coupling device, provided with adjustable feet, according to the invention.
Figure 8:
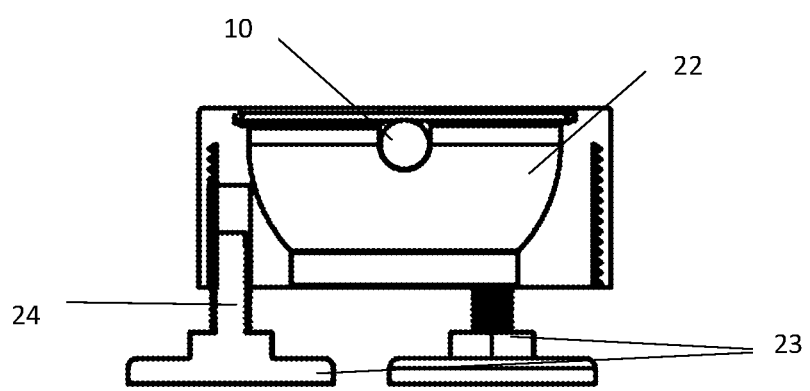
FIG. 8 is a cross-sectional view of a detail of FIG. 7, according to the invention.

Advantageously, the pressurisation of the pole 8 can also be achieved by means of elements external to the base 1 such as, for example, by means of a plurality of feet 23 provided with threads 24 placed underneath the base, as shown in FIGS. 7 and 8.

In this way, the height adjustment no longer takes place on the pole 8 but directly on the base 1. This is an alternative but equally secure and robust adjustment for the attachment of pole 8 itself.

Although at least one exemplary embodiment has been presented in the summary and detailed description, it should be understood that there are a large number of variants falling within the scope of protection of the invention.

Furthermore, it must be understood that the embodiment(s) presented are merely examples which are not intended to limit in any way the scope of protection of the invention or its application or configurations. Rather, the summary and detailed descriptions provide a convenient guide for the skilled person in the art to implement at least one exemplary embodiment, it being clear that numerous variations can be made in the function and assembly of the elements described herein, without exceeding the scope of protection of the invention as set forth in the appended claims and their technical-legal equivalents.

The invention claimed is:

1. A coupling device for a vertical pole for gym exercises comprising a base including a seat, a hemispherical element positioned within the seat, and a shaft inserted inside the hemispherical element to which the vertical pole for gym exercises is connected, wherein the hemispherical element comprises a plurality of blocking elements configured to engage a plurality of corresponding elements; on an inner surface of the seat to prevent rotation of the pole around an axis passing through a centre of the coupling device while leaving free oscillatory movement of the pole with respect to the axis.

2. The coupling device according to claim 1, wherein the plurality of blocking elements are recesses and the plurality of corresponding elements are reliefs positioned on an inner ring, the inner ring being positioned between the hemispherical element and the seat.

3. The coupling device according to claim 1, wherein the hemispherical element accommodates at least one bearing the shaft being inserted within the at least one bearing.

4. The coupling device according to claim 1, wherein each of the plurality of blocking elements is a curved side face of a regular polygon and each of the plurality of corresponding elements is a flat wall, the plurality of corresponding elements forming a regular polygon on the inner surface of the seat, wherein a number of curved side faces equals a number of flat walls.

5. The coupling device according to claim 1, further comprising a selector means operable between a first position engaging the hemispherical element so that the vertical pole for gym exercises is fixed and a second position disengaged from the hemispherical element enabling the vertical pole for gym exercises to rotate around the axis.

6. The coupling device according to claim 1, wherein the plurality of blocking elements include a plurality of balls housed in a plurality of recesses in an outer wall of the hemispherical element, which engage with a second corresponding plurality of recesses on the inner surface of the seat.

7. The coupling device according to claim 1, wherein the seat has a threaded outer wall, for adjusting a height of the seat and adjusting a pressure on the vertical pole for gym exercises.

8. The coupling device according to claim 1, wherein the base comprises a plurality of feet provided with threads extending below the base.

9. A vertical pole for gym exercises comprising at least one coupling device according to claim 1 positioned at one end thereof.

* * * * *